United States Patent
Liu et al.

(10) Patent No.: US 11,495,185 B2
(45) Date of Patent: Nov. 8, 2022

(54) VOLTAGE REGULATING CIRCUIT, VOLTAGE REGULATING METHOD AND DISPLAY DEVICE

(71) Applicant: E Ink Holdings Inc., Hsinchu (TW)

(72) Inventors: Chuen-Jen Liu, Hsinchu (TW); Liang-Yu Yan, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/443,955

(22) Filed: Jul. 29, 2021

(65) Prior Publication Data

US 2022/0068228 A1  Mar. 3, 2022

(30) Foreign Application Priority Data

Sep. 1, 2020 (TW) .................................. 109129888

(51) Int. Cl.
 *G09G 3/34* (2006.01)
 *G09G 3/20* (2006.01)

(52) U.S. Cl.
 CPC ........... *G09G 3/344* (2013.01); *G09G 3/2007* (2013.01); *G09G 2330/028* (2013.01); *G09G 2370/00* (2013.01)

(58) Field of Classification Search
 None
 See application file for complete search history.

(56) References Cited

U.S. PATENT DOCUMENTS

| | | | |
|---|---|---|---|
| 6,969,977 | B1 | 11/2005 | Smith |
| 8,901,774 | B2 | 12/2014 | Yan et al. |
| 8,971,082 | B2 | 3/2015 | Rodriquez |
| 9,379,637 | B2 | 6/2016 | Hsu |
| 9,876,439 | B2 | 1/2018 | Hsu |
| 9,958,888 | B2 | 5/2018 | Wei et al. |
| 2008/0054992 | A1 | 3/2008 | Kajiwara et al. |
| 2010/0001703 | A1* | 1/2010 | Williams ............ H02M 3/1584 323/283 |
| 2010/0277509 | A1* | 11/2010 | Lu .......................... G09G 3/344 345/690 |

(Continued)

FOREIGN PATENT DOCUMENTS

| | | |
|---|---|---|
| CN | 201041734 Y | 3/2008 |
| CN | 101192382 A | 6/2008 |

(Continued)

OTHER PUBLICATIONS

Corresponding Taiwan office action dated Jul. 30, 2021.
Corresponding Chinese office action dated Aug. 17, 2022.

*Primary Examiner* — Matthew Yeung
(74) *Attorney, Agent, or Firm* — CKC & Partners Co., LLC

(57) ABSTRACT

The present disclosure relates to a voltage regulating circuit, including an impedance circuit, a control unit and a power supply circuit. The impedance circuit has a first node and a second node, wherein the second node is electrically coupled to a load. The control unit is electrically coupled to the first node and configured to control a first voltage value of the first node according to a control signal. An input terminal of the power supply circuit is electrically coupled to the second node. An output of the power supply circuit is electrically coupled to the load. The power supply circuit is configured d to output a control voltage to the load according to a second voltage value of the second node.

12 Claims, 7 Drawing Sheets

(56) References Cited

U.S. PATENT DOCUMENTS

| | | |
|---|---|---|
| 2015/0244267 A1 | 8/2015 | Park |
| 2015/0365003 A1* | 12/2015 | Sadwick ................. H02M 3/28 363/21.01 |
| 2016/0336859 A1 | 11/2016 | Ngai et al. |
| 2019/0302821 A1 | 10/2019 | Maki et al. |
| 2020/0007021 A1* | 1/2020 | Chen ................... H02M 3/1588 |
| 2021/0118352 A1* | 4/2021 | Baek ..................... G09G 3/2007 |
| 2021/0398498 A1* | 12/2021 | Kim ......................... G09G 5/10 |

FOREIGN PATENT DOCUMENTS

| | | |
|---|---|---|
| CN | 101488324 A | 7/2009 |
| CN | 103108433 A | 5/2013 |
| CN | 102035410 B | 2/2014 |
| CN | 103973231 A | 8/2014 |
| CN | 104375555 A | 2/2015 |
| TW | 201508437 A | 3/2015 |

\* cited by examiner

VOLTAGE REGULATING CIRCUIT, VOLTAGE REGULATING METHOD AND DISPLAY DEVICE

CROSS-REFERENCE TO RELATED APPLICATION

This application claims priority to Taiwan Application Serial Number 109129888, filed Sep. 1, 2020, which is herein incorporated by reference in its entirety.

BACKGROUND

Technical Field

The present disclosure relates to a voltage regulating circuit, especially a circuit that can adjust the voltage value of the output voltage.

Description of Related Art

When the electronic device operates in different states, the internal power supply circuit needs to generate different voltages. The traditional method uses multiple sets of DC-DC modules to achieve the purpose of generating multiple sets of different voltages. However, this method requires too many components and the configuration area of the components will increase, which will affect the cost and operational stability of the electronic device.

SUMMARY

One aspect of the present disclosure is a voltage regulating circuit, comprising an impedance circuit, a control unit and a power supply circuit. The impedance circuit comprises a first node and a second node, wherein the second node is electrically coupled to a load through an impedance element. The control unit is electrically coupled to the first node, and configured to control a first voltage value of the first node according to a control signal. An input terminal of the power supply circuit electrically coupled to the second node. An output terminal of the power supply circuit electrically coupled to the load, wherein the power supply circuit is configured to output a control voltage to the load according to a second voltage value of the second node.

Another aspect of the present disclosure is a display device, comprising a display circuit and a voltage regulating circuit. The display circuit comprises a driver and at least a pixel unit. The voltage regulating circuit comprises an impedance circuit, a control unit and a power supply circuit. The impedance circuit comprises a first node and a second node, wherein the second node is electrically coupled to the display circuit through an impedance element. The control unit is electrically coupled to the first node, and configured to control a first voltage value of the first node according to a control signal. An input terminal of the power supply circuit electrically coupled to the second node. An output terminal of the power supply circuit electrically coupled to the display circuit, wherein the power supply circuit is configured to output a control voltage to the display circuit according to a second voltage value of the second node.

Another aspect of the present disclosure is a voltage regulating method, comprising the following steps: adjusting a first voltage value of a first node in an impedance circuit according to a control signal, wherein the impedance circuit comprises a plurality of resistors, the first node and a second node, and the second node is electrically coupled to a power supply circuit and a display circuit; outputting a control voltage to the display circuit through the power supply circuit according to a second voltage value of the second node; and driving at least a pixel unit through the display circuit according to the control voltage to adjust a grayscale value of the at least pixel unit.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1A:
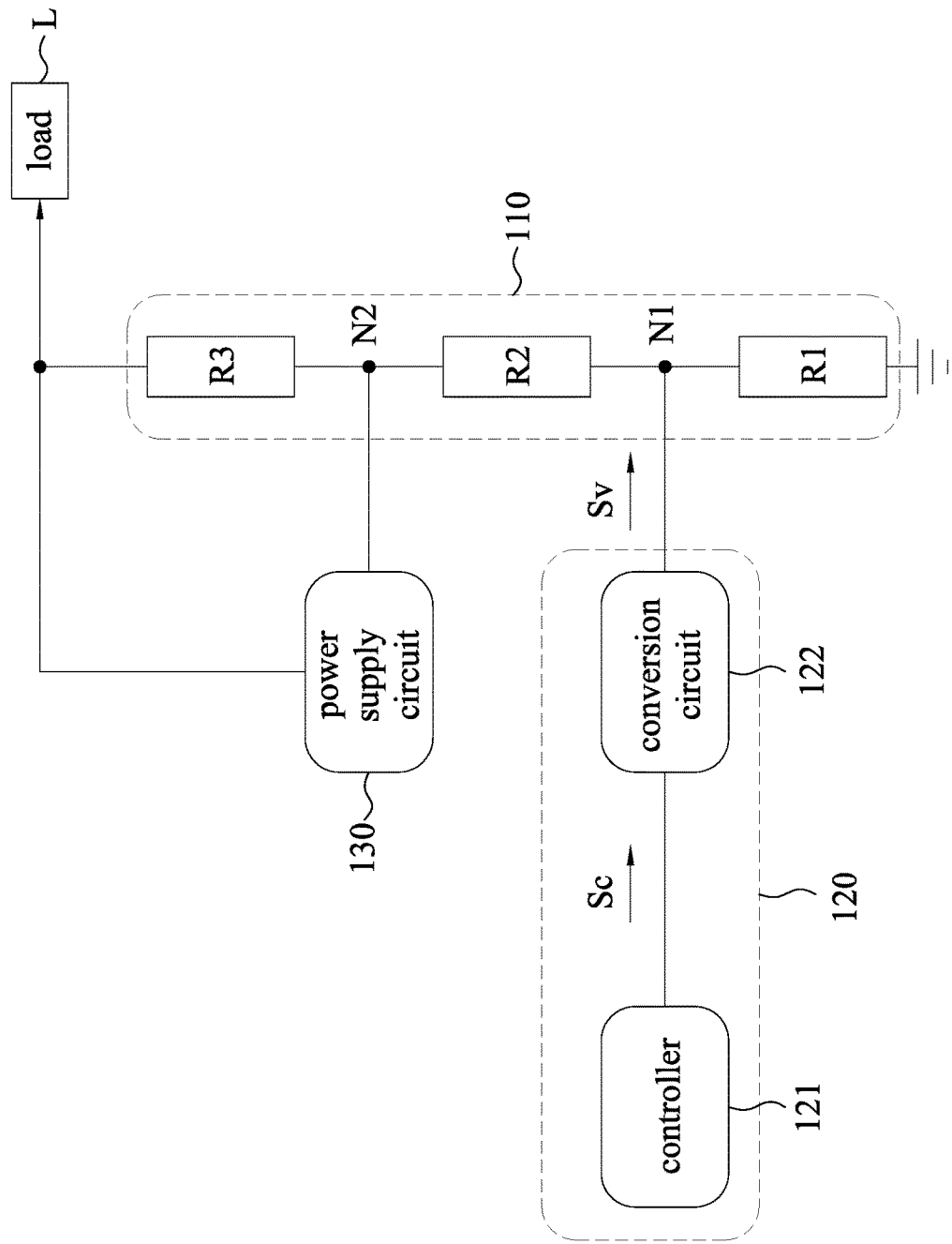
FIG. 1A is a schematic diagram of a voltage regulating circuit in some embodiments of the present disclosure.

The present disclosure relates to a voltage regulating circuit. FIG. 1A is a schematic diagram of a voltage regulating circuit 100 in some embodiments of the present disclosure. The voltage regulating circuit 100 is configured to output a control voltage to the load L, and can dynamically adjust the control voltage according to a control signal. In one embodiment, the load L is a kind of the display device, is configured to drive a plurality of the pixel units according to the control voltage (e.g., adjust the grayscale value or color displayed by each pixel unit), but the present disclosure does not limit this.

In one embodiment, the voltage regulating circuit 100 includes a impedance circuit 110, a control unit 120 and a power supply circuit 130. The impedance circuit 110 has a first node N1 and a second node N2, wherein the first node N1 is configured to receive the control voltage, the second node N2 is electrically coupled to the load L. As shown in FIG. 1A, in some embodiments, the impedance circuit 110 includes a first resistor R1, a second resistor R2 and a third resistor R3. The first resistor R1 is electrically coupled between the first node N1 and the reference potential (e.g., ground). The second resistor R2 is electrically coupled between the first node N1 and the second node N2. The third resistor R3 is electrically coupled between the second node N2 and the load L.

Specifically, the equivalent impedance of the second resistor R2 and the equivalent impedance formed by the third resistor R3 and the load L are different. Therefore, when the voltage value of the first node N1 changes, according to the partial pressure theorem, the voltage value of the second node N2 will change accordingly. In one embodiment, the resistors R1-R3 include a resistance element. In some other embodiments, the resistors R1-R3 may also be composed of other electronic components or circuits with different impedances.

In some embodiments, there is a impedance element (e.g., the third resistor R3) between the second node N2 and the output terminal of the voltage regulating circuit 100, so no short circuit will cause. In other words, the second node N2 is electrically coupled to the load L through the impedance element.

An output terminal of the control unit 120 is electrically coupled to the first node N1, and is configured to control a first voltage value in the first node N1 according to the control signal. In one embodiment, the control unit 120 includes a controller 121 and a conversion circuit 122. The controller 121 (e.g., microprocessor) is configured to generate the control signal, and is configured to output the control signal to the conversion circuit 122. The conversion circuit 122 is electrically coupled between the controller 121 and the first node N1, and is configured to output an adjustment signal Sv to the first node N1 according to the received control signal Sc, so that the first node N1 is controlled to the first voltage value. In some embodiments, the conversion circuit 122 is configured to control a voltage value in the adjustment signal Sv, so as to directly maintain the first voltage value of the first node N1. In some other embodiments, the conversion circuit 122 is configured to control a current value of the adjustment signal Sv, so that after the current flows through the first resistor R1, the first voltage value on the first node N1 can be formed stably.

Figure 1B:
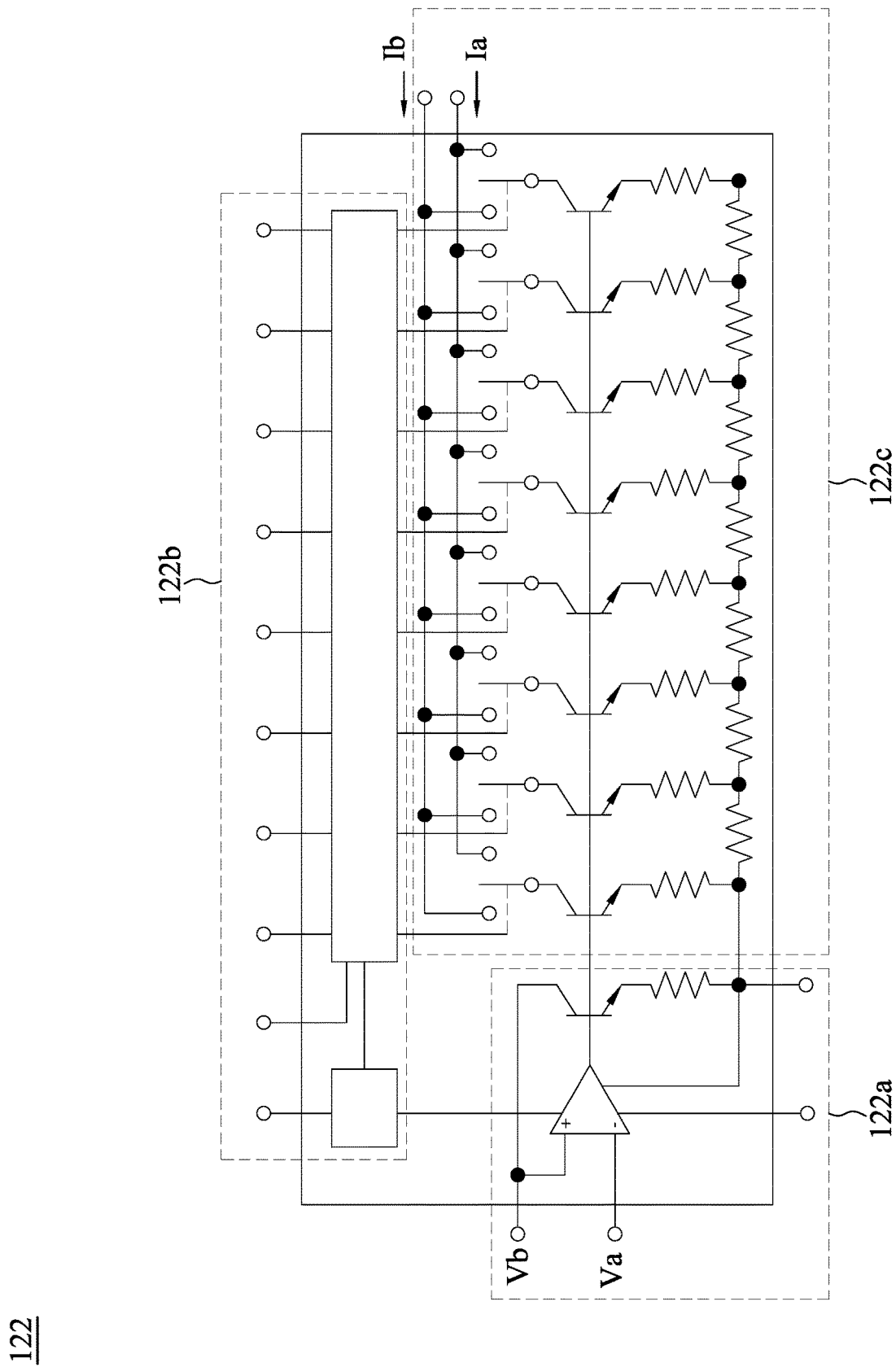
FIG. 1B is a schematic diagram of a conversion circuit in some embodiments of the present disclosure.
Figure 2:
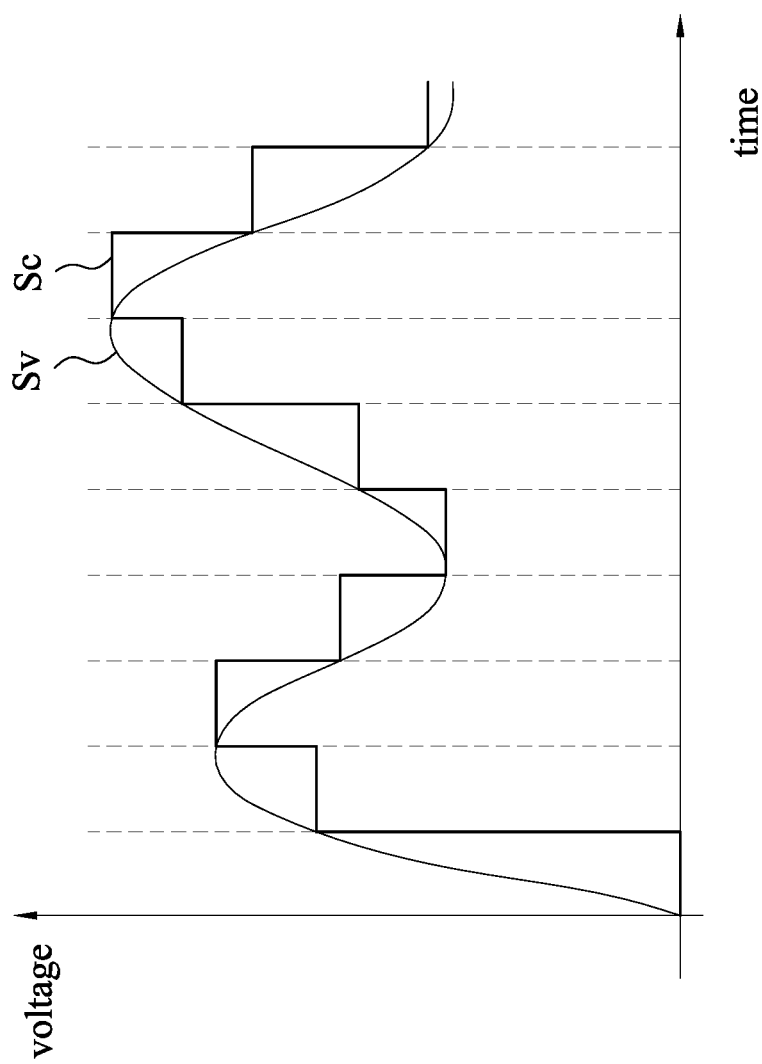
FIG. 2 is a schematic diagram of the control signal and the adjustment signal in some embodiments of the present disclosure.

As shown in FIG. 1A, FIG. 1B and FIG. 2, wherein FIG. 1B is a schematic diagram of a conversion circuit in some embodiments of the present disclosure, FIG. 2 is a schematic diagram of the control signal Sc and the adjustment signal Sv in some embodiments of the present disclosure. In one embodiment, the conversion circuit 122 is a digital to analog converter. In other words, the control signal Sc is a digital signal, and the adjustment signal Sv is the analog signal. The conversion circuit 122 is configured to convert the digital control signal Sc to the adjustment signal Sv, which is a analog signal. As shown in FIG. 1A, in some embodiments, the conversion circuit 122 includes an amplifier circuit 122a, a bias circuit 122b, and a current switching circuit 122c. The amplifier circuit 122a is configured to perform an amplifying process according to a voltage difference between the two input voltages Va and Vb (the two input voltages Va and Vb can be the control signal Sc and a reference potential, respectively). Then, the current switching circuit 122c generates the corresponding output currents Ia, Ib according to the amplified input signal and the voltage provided by the bias circuit 122b. The output currents Ia, Ib forms an analog output signal (i.e., the adjustment signal Sv) on the load (not shown in the figure). Since those skilled in the art can understand the circuit structure and operation principle of the conversion circuit 122, it will not be repeated here.

In some embodiments, the control signal Sc further includes a communication interface signal. The above communication interface signal is set by the controller 121 of the control unit 120, then transmitted to the conversion circuit 122. The format of the communication interface signal may be SPI, I2C or RS485, and the user can set different the communication interface signals through the controller 121 and output to the conversion circuit 122.

As shown in FIG. 1A, the input terminal of the power supply circuit 130 (e.g., DC to DC Converter) is electrically coupled to the second node N2, the output terminal of the power supply circuit 130 is electrically coupled to the output terminal of the voltage regulating circuit 100, so as to provide the control voltage to the load L. The power supply circuit 130 generates the control voltage according to the second voltage value of the second node N2. In other words, when the second voltage value of the second node N2 changes, the control voltage output by the power supply circuit 130 will change accordingly. Since those skilled in the art can understand the circuit structure and operating principle of the power supply circuit 130, it will not be repeated here.

In some embodiments, the controller 121 of the control unit 120 is electrically coupled to the power supply circuit 130, and is configured to adjust the power supply circuit 130 to output the different voltage values.

The voltage regulating circuit 100 adjusts the control voltage by changing the first voltage value of the first node N1. Therefore, the power supply circuit 130 does not need to connect a plurality of switches to a plurality of different voltage dividing circuits, and does not need to switch those switches to achieve a purpose, which is to generate different control voltages.

Figure 3:
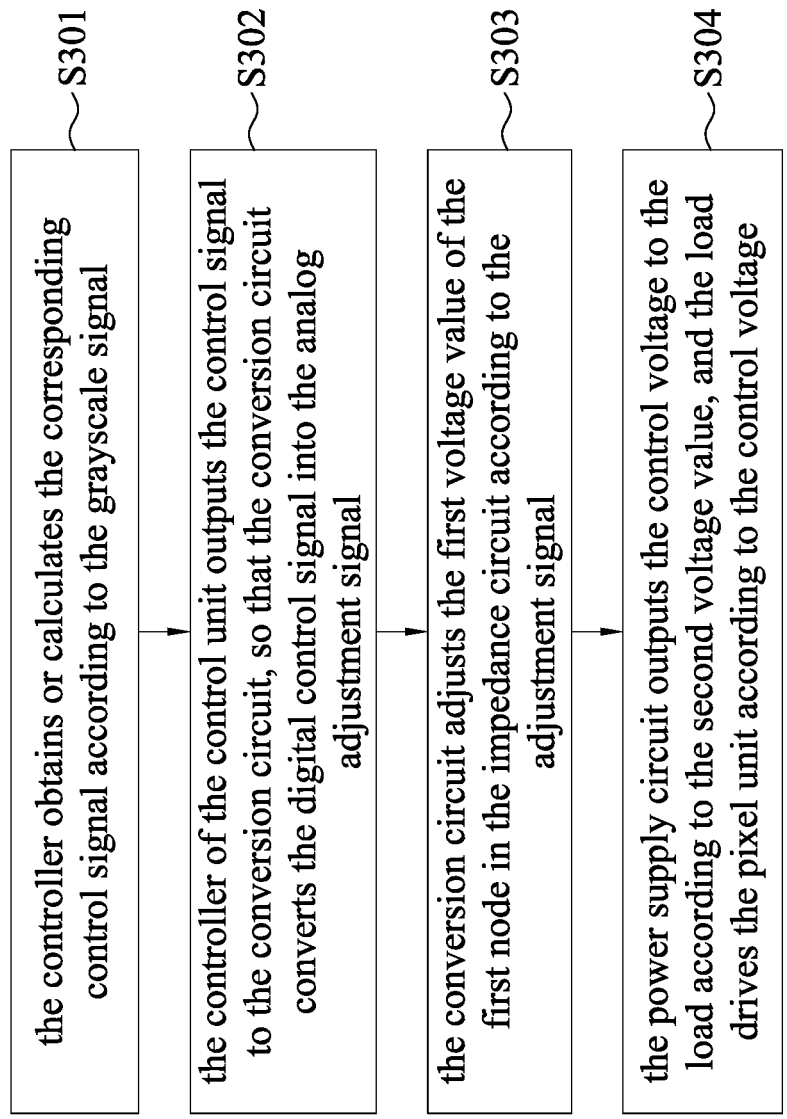
FIG. 3 is a flowchart illustrating a voltage regulating method in some embodiments of the present disclosure.

FIG. 3 is a flowchart illustrating a voltage regulating method in some embodiments of the present disclosure, and corresponds to the voltage regulating circuit 100 as shown in FIG. 1A. The voltage regulating method includes steps S301~S304, and may be applied to the display device. The display device includes the display circuit and a plurality of pixel units, and its structure will be explained in subsequent paragraphs.

In the step S301, the controller 121 of the voltage regulating circuit 100 receives a grayscale signal from the outside (e.g., the display circuit or the processor of the display panel). In one embodiment, the grayscale signal corresponds to one or more of the pixel unit in the display circuit. The controller 121 obtains or calculates the corresponding control signal according to the grayscale signal. For example, if the grayscale signal is "grayscale value 150", the controller 121 can find a voltage value (e.g., 30 volts) corresponding to "grayscale value 150" according to a comparison table or conversion formula stored internally. In other words, when the voltage of the first node N1 is controlled at 30 volts, the control voltage output by the power supply circuit 130 will enable the pixel unit to show "grayscale value 150".

In the step S302, the controller 121 of the control unit 120 outputs the control signal to the conversion circuit 122, so that the conversion circuit 122 converts the digital control signal into the analog adjustment signal. In the step S303, the conversion circuit 122 adjusts the first voltage value of the first node N1 in the impedance circuit 110 according to the adjustment signal. Since the equivalent impedance of the second resistor R2 is different from the equivalent impedance formed by the third resistor R3 and the load L, according to the voltage division theorem, when the voltage value of the first node N1 changes, the second voltage value on the second node N2 will change accordingly. The second voltage value on the second node N2 will be used as the input signal to the input terminal of the power supply circuit 130.

In the step S304, the power supply circuit 130 outputs the control voltage to the load L (i.e., the display circuit) according to the second voltage value. The load L (i.e., the display circuit) drives the pixel unit according to the control voltage, so as to adjust the grayscale value displayed by the pixel unit. Accordingly, by adjusting the first voltage value of the first node N1, the control voltage of the power supply circuit 130 output to the load L can be accurately adjusted.

Figure 4:
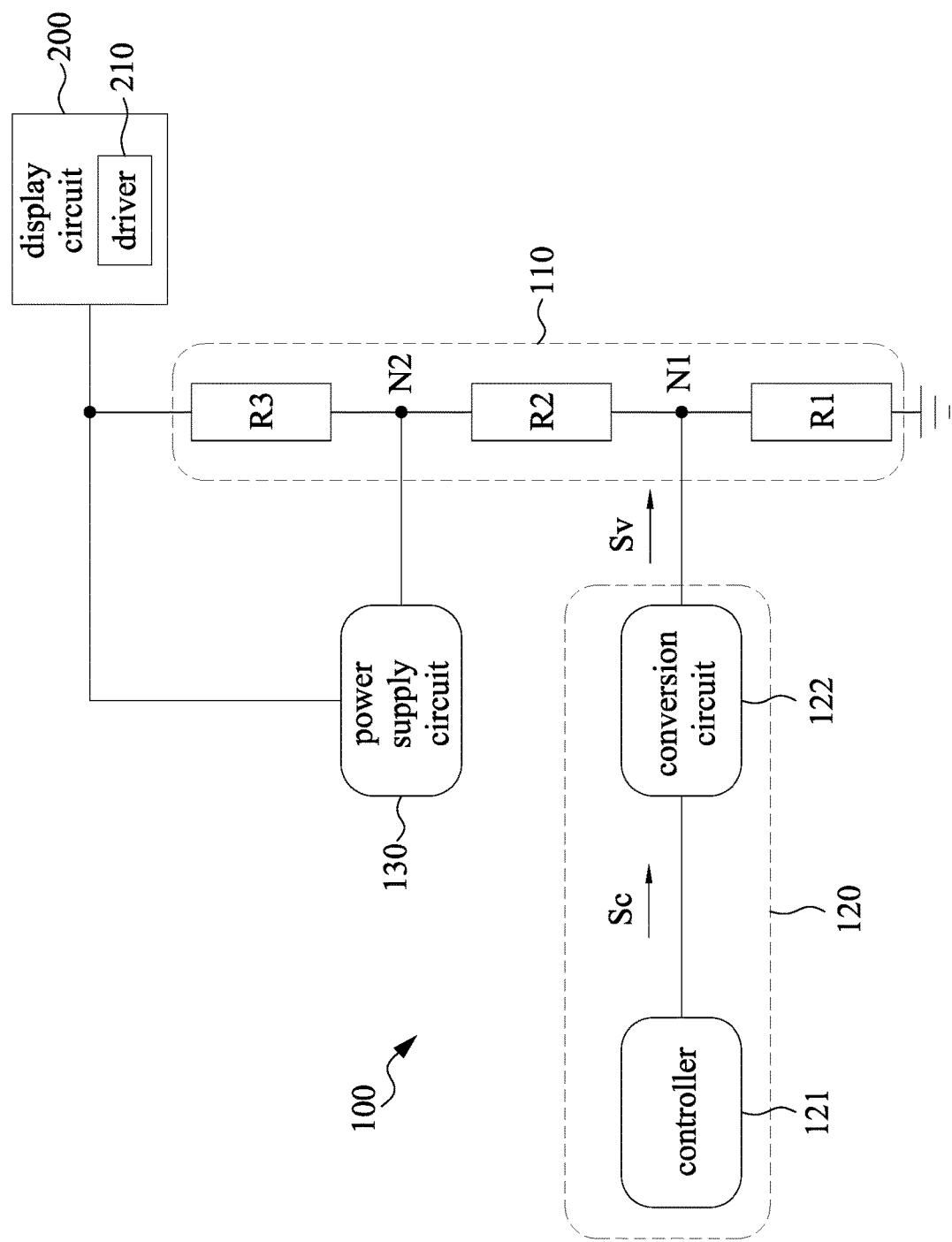
FIG. 4 is a schematic diagram of a display device in some embodiments of the present disclosure.
Figure 5:
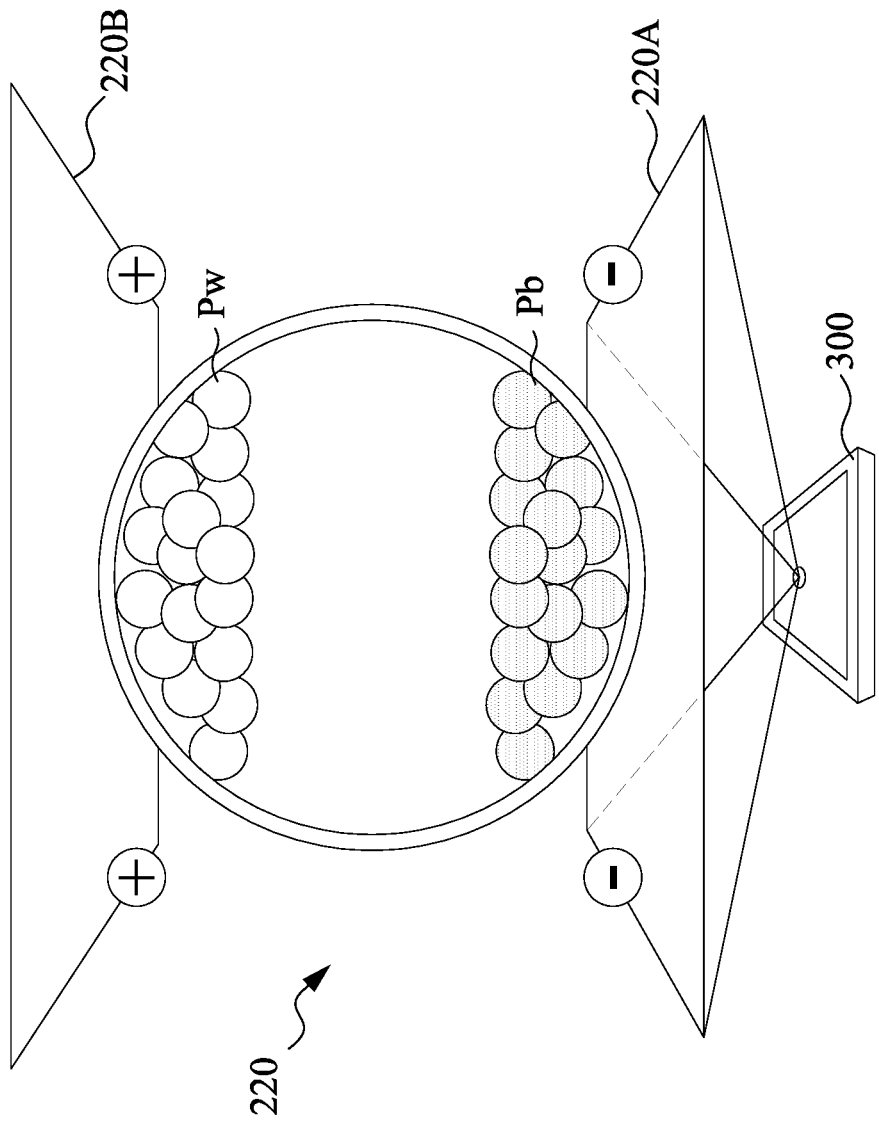
FIG. 5 is a schematic diagram of a pixel unit in some embodiments of the present disclosure.

FIG. 4 is a schematic diagram of a display device 300 in some embodiments of the present disclosure. FIG. 5 is a schematic diagram of a pixel unit 220 in some embodiments of the present disclosure. The display device 300 includes a voltage regulating circuit 100 and a display circuit 200. The structure and operation of the voltage regulating circuit 100 are as described in the previous embodiments, so it will not be repeated here.

Specifically, the display circuit 200 is used as the load of the voltage regulating circuit 100, is configured to receive the control voltage output by the voltage regulating circuit 100 and a plurality of pixel units 220 (as shown in FIG. 5). In one embodiment, the display device 300 can be an electronic paper or electrophoretic display. The driver 210 can be a driver chip. After receiving the control voltage, the driver 210 outputs a electric field according to the control voltage through a plurality of driver electrodes (not shown in the figure).

To illustrate the pixel unit 220 clearly, FIG. 5 shows a single pixel unit 220 enlarged. The pixel unit 220 includes at least two substrates 220A, 220B and a plurality of the electrophoretic particles Pb, Pw. After the driver 210 receives the control voltage, the driver 210 generates the electric field through the driving electrodes according to the control voltage, so as to adjust positions of the electrophoretic particles Pb, and Pw between the two substrates 220A and 220B. For example, the first electrophoretic particles Pb are black particles with a positive charge, and the second electrophoretic particles Pw are white particles with a negative charge. In other words, the first electrophoretic particles Pb and the second electrophoretic particles Pw have different colors. When the driver 210 generates the electric field through the driving electrodes, according to the characteristics of "positive and negative charge attraction", the first electrophoretic particles Pb and the second electrophoretic particles Pw will be controlled at the expected position between the two substrates 220A, thereby showing the corresponding grayscale brightness.

In some embodiments, the electrophoretic particles Pb and Pw can be made by Electrophoretic Ink technology, and are respectively encapsulated in multiple microcapsules.

Figure 6:
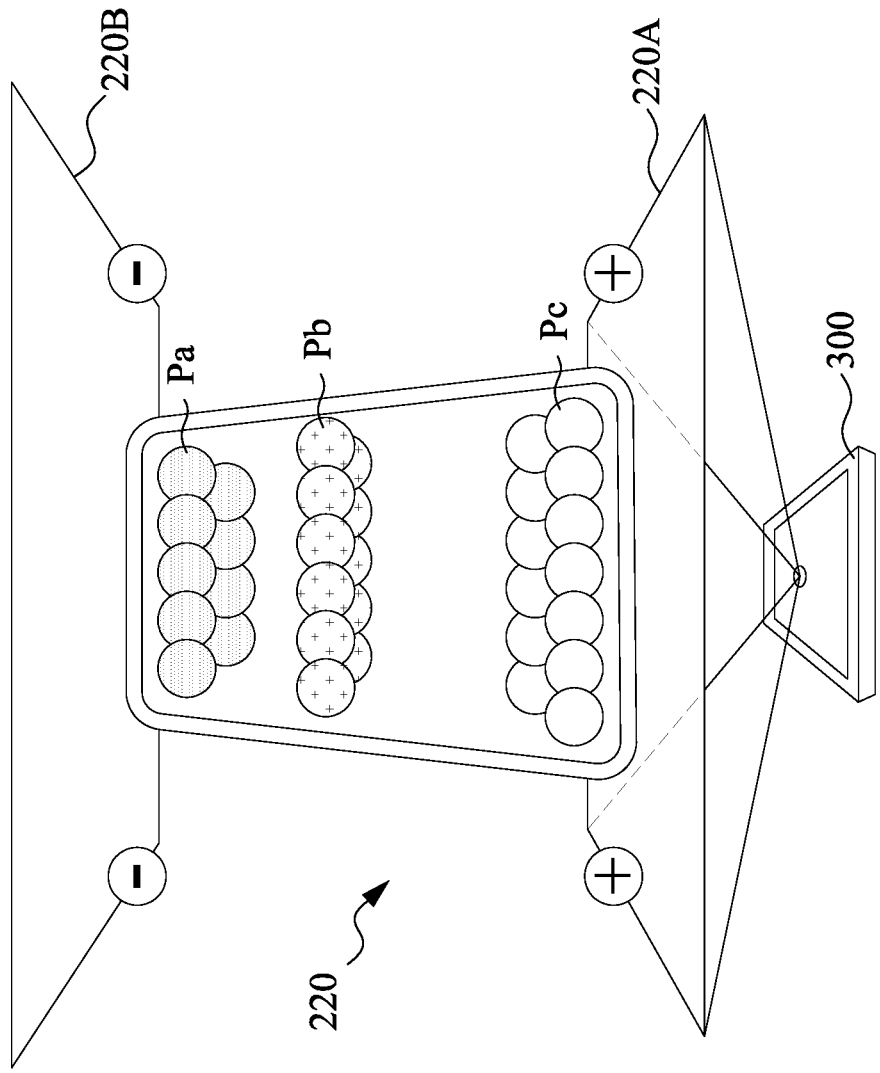
FIG. 6 is a schematic diagram of a pixel unit in some embodiments of the present disclosure.

FIG. 6 is a schematic diagram of a pixel unit in some embodiments of the present disclosure. In one embodiment, the display circuit may include a plurality of different colors of electrophoretic particles Pa, Pb, Pc. The electrophoretic particles Pa, Pb, Pc are controlled between the two substrates 220A, 220B according to the Microcup technology. Since those in the art can understand the control principle of the microcup technology, it will not be repeated here.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A voltage regulating circuit, comprising:
   an impedance circuit comprising a first node and a second node, wherein the second node is electrically coupled to a load through an impedance element;
   a control unit electrically coupled to the first node, and configured to control a first voltage value of the first node according to a control signal; and
   a power supply circuit, an input terminal of the power supply circuit electrically coupled to the second node, an output terminal of the power supply circuit electrically coupled to the load, wherein the power supply circuit is configured to output a control voltage to the load according to a second voltage value of the second node;
   wherein the control unit comprises:
      a controller configured to receive a grayscale signal corresponding to at least a pixel unit in a display circuit and output the control signal according to the grayscale signal; and
      a conversion circuit electrically coupled to the control unit and the first node, and configured to output an adjustment signal to the first node, so that the first node is controlled to the first voltage value;
   wherein the power supply circuit drives the at least pixel unit through the display circuit according to the control voltage to adjust a grayscale value of the at least pixel unit;
   wherein the power supply circuit generates the control voltage according to the second voltage value of the second node;
   wherein the controller is electrically coupled to the power supply circuit for adjusting the power supply circuit to output different voltage values.

2. The voltage regulating circuit of claim 1, wherein the control signal is a digital signal, and the conversion circuit is configured to convert the control signal to the adjustment signal, which is an analog signal.

3. The voltage regulating circuit of claim 1, wherein the control signal further comprises a communication interface signal, the controller is configured to set the communication interface signal, and the communication interface signal is output to the conversion circuit.

4. The voltage regulating circuit of claim 1, wherein the impedance circuit comprises:
   a first resistor electrically coupled between the first node and a reference potential;
   a second resistor electrically coupled between the first node and the second node; and
   a third resistor is electrically coupled between the second node and the load as the impedance element.

5. A display device, comprising:
   a display circuit, comprising a driver and at least a pixel unit; and
   a voltage regulating circuit, comprising:
      an impedance circuit comprising a first node and a second node, wherein the second node is electrically coupled to the display circuit through an impedance element;

a control unit electrically coupled to the first node, and configured to control a first voltage value of the first node according to a control signal; and a power supply circuit, an input terminal of the power supply circuit electrically coupled to the second node, an output terminal of the power supply circuit electrically coupled to the display circuit, wherein the power supply circuit is configured to output a control voltage to the display circuit according to a second voltage value of the second node;

wherein the control unit comprises:

a controller configured to receive a grayscale signal corresponding to the at least pixel unit in the display circuit and output the control signal according to the gray scale signal; and a conversion circuit electrically coupled to the control unit and the first node, and configured to output an adjustment signal to the first node, so that the first node is controlled to the first voltage value;

wherein the power supply circuit drives the at least pixel unit through the display circuit according to the control voltage to adjust a grayscale value of the at least pixel unit;

wherein the power supply circuit generates the control voltage according to the second voltage value of the second node;

wherein the controller is electrically coupled to the power supply circuit for adjusting the power supply circuit to output different voltage values.

6. The display device of claim 5, wherein the at least pixel unit comprises a plurality of electrophoretic particles, and the driver is configured to generate an electric field according to the control voltage to adjust a plurality of positions of the electrophoretic particles.

7. The display device of claim 6, wherein the control signal further comprises a communication interface signal, a controller of the control unit is configured to set the communication interface signal, and the communication interface signal is output to a conversion circuit of the control unit.

8. The display device of claim 5, wherein the control signal is a digital signal, and the conversion circuit is configured to convert the control signal to the adjustment signal, which is an analog signal.

9. The display device of claim 5, wherein the impedance circuit comprises:

a first resistor electrically coupled between the first node and a reference potential;

a second resistor electrically coupled between the first node and the second node; and a third resistor is electrically coupled between the second node and the display circuit as the impedance element.

10. A voltage regulating method, comprising:

receiving a grayscale signal corresponding to at least a pixel unit in a display circuit;

outputting a control signal according to the grayscale signal;

adjusting a first voltage value of a first node in an impedance circuit according to the control signal, wherein the impedance circuit comprises a plurality of resistors, the first node and a second node, and the second node is electrically coupled to a power supply circuit and the display circuit;

generating a control voltage, by the power supply circuit, according to a second voltage value of the second node;

outputting the control voltage to the display circuit through the power supply circuit, wherein when the second voltage value of the second node changes, the control voltage outputted by the power supply circuit changes accordingly; and driving the at least pixel unit through the display circuit according to the control voltage to adjust a grayscale value of the at least pixel unit.

11. The voltage regulating method of claim 10, wherein driving the at least pixel unit through the display circuit according to the control voltage to adjust the grayscale value of the at least pixel unit comprises:

generating an electric field according to the control voltage to adjust a plurality of positions of a plurality of electrophoretic particles of the at least pixel unit.

12. The voltage regulating method of claim 10, wherein the control signal is a digital signal, and adjusting the first voltage value of the first node comprises:

converting the control signal to an adjustment signal by the conversion circuit, wherein the adjustment signal is an analog signal; and outputting the adjustment signal to the first node.

* * * * *